(12) United States Patent
Kadono et al.

(10) Patent No.: US 12,731,798 B2
(45) Date of Patent: Sep. 8, 2026

(54) FUEL CELL ASSEMBLY AND METHOD FOR MANUFACTURING THE SAME

(71) Applicant: Sumitomo Riko Company Limited, Aichi (JP)

(72) Inventors: Hideya Kadono, Aichi (JP); Hideki Oshima, Aichi (JP); Hiroki Itakura, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 662 days.

(21) Appl. No.: 18/314,124

(22) Filed: May 8, 2023

(65) Prior Publication Data

US 2023/0275241 A1 Aug. 31, 2023

Related U.S. Application Data

(63) Continuation of application No. PCT/JP2021/047807, filed on Dec. 23, 2021.

(51) Int. Cl.

*H01M 8/0284* (2016.01)
*H01M 8/0273* (2016.01)
*H01M 8/0276* (2016.01)
*H01M 8/0286* (2016.01)

(Continued)

(52) U.S. Cl.

CPC ....... *H01M 8/0284* (2013.01); *H01M 8/0273* (2013.01); *H01M 8/0276* (2013.01); *H01M 8/0286* (2013.01); *H01M 8/1004* (2013.01); *H01M 2008/1095* (2013.01)

(58) Field of Classification Search

None

See application file for complete search history.

(56) References Cited

U.S. PATENT DOCUMENTS

| | | | |
|---|---|---|---|
| 6,716,550 | B1 | 4/2004 | Kirby |
| 7,070,876 | B2 | 7/2006 | Artibise et al. |
| 9,331,346 | B2 | 5/2016 | Tanaka et al. |

(Continued)

FOREIGN PATENT DOCUMENTS

| | | |
|---|---|---|
| JP | 2007066766 | 3/2007 |
| JP | 2013168353 | 8/2013 |
| JP | 2015095439 | 5/2015 |

OTHER PUBLICATIONS

"Office Action of Japan Counterpart Application", issued on Jul. 1, 2025, with English translation thereof, p. 1-p. 7.

(Continued)

*Primary Examiner* — Jonathan Crepeau

(74) *Attorney, Agent, or Firm* — JCIPRNET

(57) ABSTRACT

A fuel cell assembly includes an electrode member that has a membrane electrode assembly having an electrolyte membrane and an electrode catalyst layer, and gas diffusion layers; a solid rubber gasket that is disposed in a frame shape on an outward side of the electrode member in a surface direction; and a bonding member that is disposed in a frame shape on the outward side of the electrode member in the surface direction, is bonded to the electrode member and the gasket, and integrates these. A form of bonding the bonding member to the electrode member is at least one of impregnation with the gas diffusion layers and bonding to the membrane electrode assembly. A thickness of the bonding member is equal to or larger than a thickness of the gas diffusion layer, and at least a portion on a surface of the bonding member is coated with the gasket.

12 Claims, 5 Drawing Sheets

(51) Int. Cl.
*H01M 8/1004* (2016.01)
*H01M 8/10* (2016.01)

(56) References Cited

U.S. PATENT DOCUMENTS

| | | | |
|---|---|---|---|
| 2011/0311898 | A1 | 12/2011 | Yamauchi et al. |
| 2013/0183604 | A1 | 7/2013 | Tanaka et al. |
| 2021/0036341 | A1 | 2/2021 | Jeong et al. |

OTHER PUBLICATIONS

"Search Report of Europe Counterpart Application", issued on Nov. 15, 2024, p. 1-p. 9.

FUEL CELL ASSEMBLY AND METHOD FOR MANUFACTURING THE SAME

CROSS-REFERENCE TO RELATED APPLICATIONS

This application is a Continuation of PCT International Application No. PCT/JP2021/047807 filed on Dec. 23, 2021. The above applications are hereby expressly incorporated by reference, in its entirety, into the present application.

TECHNICAL FIELD

The present disclosure relates to a fuel cell assembly in which an electrode member and a gasket are integrated by a bonding member, and a method for manufacturing the same.

BACKGROUND ART

A fuel cell exhibits a stack structure in which numerous cells are stacked. A stack of cells is fastened by end plates disposed on both sides in a stacking direction. For example, each cell of a solid polymer fuel cell has an electrode member having a membrane electrode assembly (MEA) and a gas diffusion layer, a separator stacked in the electrode member, and a rubber gasket disposed around the electrode member and sealing the electrode member with respect to a reaction gas or a refrigerant.

Silicone rubber is often used as a material of a gasket (for example, refer to Patent Literature 1 to Patent Literature 3). Since silicone rubber is in a liquid state before being hardened, it is easily shaped by injection molding or the like and hardened at a relatively low temperature. In addition, if a liquid silicone rubber is subjected to injection molding, since a portion of the material is impregnated with a gas diffusion layer of an electrode member, sealability can be enhanced. However, regarding silicone rubber, there is a likelihood that siloxane bonds (Si—O—Si bonds) will be hydrolyzed in an operation environment of a fuel cell, and thus there is concern over degradation in sealability. In addition, there is a likelihood that decomposition products generated through hydrolysis of silicone rubber will contaminate an electrolyte membrane and an electrode catalyst layer constituting an MEA, resulting in deterioration thereof.

For this reason, gasket materials replacing silicone rubber have been examined. From the viewpoint of excellent durability and high-temperature characteristics, low gas permeability, and the like, examples thereof include ethylene-propylene-diene rubber (EPDM) and fluorine rubber.

CITATION LIST

Patent Literature

[Patent Literature 1]
Specification of U.S. Pat. No. 7,070,876
[Patent Literature 2]
Specification of U.S. Pat. No. 6,716,550
[Patent Literature 3]
Japanese Patent Laid-Open No. 2013-168353
[Patent Literature 4]
Japanese Patent Laid-Open No. 2007-66766

SUMMARY OF INVENTION

Technical Problem

However, since EPDM and fluorine rubber are in a solid state, that is, solid rubber before being hardened, it is not possible to obtain fluidity equivalent to that of silicone rubber. In addition, polymer membranes such as perfluorinated sulfonic acid membranes are used as electrolyte membranes for solid polymer fuel batteries. Thus, when a material of a gasket is disposed and hardened near an electrolyte membrane, there is a need to consider that the electrolyte membrane be prevented from being degenerated due to heat at the time of hardening and a gas diffusion layer also be prevented from being damaged due to stress such as an injection pressure at the time of shaping. However, at a temperature under consideration of a heat resistant temperature of the electrolyte membrane, it is difficult to practically harden EPDM and fluorine rubber in a relatively short period of time. In this manner, when solid rubber such as EPDM or fluorine rubber is used, it is difficult to integrally shape a gasket with an electrode member through injection molding at a relatively low temperature.

For example, Patent Literature 2 discloses a membrane electrode sealing assembly including an MEA, a framing seal, and an integral seal. A framing seal is formed of silicone, EPDM, or the like as a separate member and is disposed such that an end part of the MEA is sandwiched in a thickness direction. An integral seal is formed of a liquid sealant material such as a thermoplastic resin or a liquid elastomer such as silicone and is impregnated with a fluid distribution layer (gas diffusion layer) of the MEA. The framing seal and the integral seal are not bonded.

Patent Literature 3 discloses a fuel cell including an electrode member that has an MEA and a gas diffusion layer, a resin frame member that is disposed in an outer circumference of the electrode member, a separator, and a seal member (gasket). The resin frame member is made of polyphenylene sulfide (PPS) or the like, is bonded to the MEA with a bonding layer therebetween, and is bonded to the gas diffusion layer with a resin impregnated part therebetween. The seal member is made of silicone rubber, EPDM, or the like, is integrated with the separator, and is not bonded to the resin frame member.

Patent Literature 4 discloses an assembly including an electrode member that has an MEA and gas diffusion layers, and a gasket structure that is disposed in an outer circumference of the electrode member. The gas diffusion layers having different surface areas are respectively disposed on both surfaces of an electrolyte membrane. The gasket structure is formed of polyethylene naphthalate (PEN), polyethylene terephthalate (PET), or the like. The gasket structure is bonded to a surface of the electrolyte membrane exposed on a side having a smaller surface area in the gas diffusion layer, or an outer circumferential end surface of the gas diffusion layer with a bonding layer therebetween. The bonding layer is made of a hot-melt bonding agent such as polyolefin. The bonding layer has a thickness smaller than the thickness of the gas diffusion layer and does not come into contact with an outer circumferential end surface of the electrolyte membrane.

Patent Literature 2 and Patent Literature 3 disclose that silicone rubber, EPDM, and the like are on the same plane as a material of the gasket, but do not disclose consideration of degradation in sealability when silicone rubber is used and contamination of the MEA due to a decomposition product. In addition, the structures disclosed in Patent Literature 2 and Patent Literature 3 are not structures in which the gasket and the electrode member are integrated with a bonding member therebetween. In the assembly disclosed in Patent Literature 4, the gasket and the electrolyte membrane are bonded to each other with a bonding layer therebetween. However, the outer circumferential end surface of the electrolyte membrane is not coated with the bonding layer, and the thickness of the bonding layer is smaller than the thickness of the gas diffusion layer. In addition, there is no impregnation with the gas diffusion layer. For this reason, a holding force with respect to the electrode member is small, and thus there is a likelihood of damage during handling or damage due to an external input such as vibration at the time of stacking.

The present disclosure has been made in consideration of such circumstances and provides a fuel cell assembly in which a solid rubber gasket and an electrode member are integrated and which has excellent sealability, durability, and productivity, and a method for manufacturing the same.

Solution to Problem (1) In order to solve the foregoing problems, a fuel cell assembly of the present disclosure includes an electrode member that has a membrane electrode assembly having an electrolyte membrane and an electrode catalyst layer, and a gas diffusion layer disposed on at least one surface of both surfaces of the membrane electrode assembly in a thickness direction; a solid rubber gasket that, having a direction intersecting a stacking direction of the electrode member as a surface direction, is disposed in a frame shape on an outward side of the electrode member in the surface direction; and a bonding member that has a thermoplastic polymer, is disposed in a frame shape on the outward side of the electrode member in the surface direction, is bonded to the electrode member and the gasket, and integrates the electrode member and the gasket. A form of bonding the bonding member to the electrode member is at least one of impregnation with the gas diffusion layer and bonding to the membrane electrode assembly. At least an outer circumferential end surface of the electrolyte membrane is coated with the bonding member. In the stacking direction of the electrode member, a thickness of the bonding member is equal to or larger than a thickness of the gas diffusion layer disposed on the one surface of the membrane electrode assembly, and at least a portion on a surface of the bonding member in the thickness direction is coated with the gasket.

(2) A method for manufacturing the fuel cell assembly of the present disclosure as a first example of the method for manufacturing the fuel cell assembly having the constitution of the foregoing (1) includes a gasket shaping step of shaping a gasket from solid rubber; a disposing step of disposing an electrode member that has a membrane electrode assembly having an electrolyte membrane and an electrode catalyst layer and a gas diffusion layer disposed on at least one surface of both surfaces of the membrane electrode assembly in a thickness direction, the molded gasket, and a bonding member that has a thermoplastic polymer; and an integrating step of integrating the electrode member and the gasket using the bonding member by melting and then hardening the bonding member.

(3) A method for manufacturing the fuel cell assembly of the present disclosure as a second example of the method for manufacturing the fuel cell assembly having the constitution of the foregoing (1) includes a gasket shaping step of shaping a gasket from solid rubber; a disposing step of disposing an electrode member that has a membrane electrode assembly having an electrolyte membrane and an electrode catalyst layer and a gas diffusion layer disposed on at least one surface of both surfaces of the membrane electrode assembly in a thickness direction, and the molded gasket inside a shaping mold; and an integrating step of integrating the electrode member and the gasket using a bonding member that is a hardened product of a liquid composition having a thermoplastic polymer by injecting the liquid composition into the shaping mold and hardening the liquid composition therein.

(4) The fuel cell assembly having the constitution of the foregoing (1) may further include a separator that is stacked on the electrode member and the gasket. The bonding member may be formed to be bonded to the electrode member, the gasket, and the separator and integrate the electrode member, the gasket, and the separator.

(5) A method for manufacturing the fuel cell assembly of the present disclosure as a first example of the method for manufacturing the fuel cell assembly including the separator having the constitution of the foregoing (4) includes a gasket shaping step of shaping a gasket from solid rubber; a disposing step of disposing, on a surface of a separator, an electrode member that has a membrane electrode assembly having an electrolyte membrane and an electrode catalyst layer and a gas diffusion layer disposed on at least one surface of both surfaces of the membrane electrode assembly in a thickness direction, the molded gasket, and a bonding member that has a thermoplastic polymer; and an integrating step of integrating the electrode member, the gasket, and the separator using the bonding member by melting and then hardening the bonding member.

(6) A method for manufacturing the fuel cell assembly of the present disclosure as a second example of the method for manufacturing the fuel cell assembly including the separator having the constitution of the foregoing (4) includes a gasket shaping step of shaping a gasket from solid rubber; a disposing step of disposing a separator inside a shaping mold and further disposing, on a surface thereof, an electrode member that has a membrane electrode assembly having an electrolyte membrane and an electrode catalyst layer and a gas diffusion layer disposed on at least one surface of both surfaces of the membrane electrode assembly in a thickness direction, and the molded gasket; and an integrating step of integrating the electrode member, the gasket, and the separator using a bonding member that is a hardened product of a liquid composition having a thermoplastic polymer by injecting the liquid composition into the shaping mold and hardening the liquid composition therein.

Advantageous Effects of Invention (1) According to the fuel cell assembly of the present disclosure, the gasket is manufactured of solid rubber instead of liquid rubber. Since liquid silicone rubber does not have to be used, it is possible to resolve the problems of degradation in sealability due to hydrolysis of siloxane bonds and contamination of an MEA due to a decomposition product. The gasket is bonded to the electrode member by the bonding member. Accordingly, there is no need to impregnate the gasket with the gas diffusion layer of the electrode member in order to enhance bondability and sealability. Since contact between the gasket and the electrode member is reduced, there is little concern over degradation in sealability caused by a material of the gasket, contamination of the MEA, or the like. Thus, the degree of freedom in selecting the material of the gasket increases.

In the fuel cell assembly of the present disclosure, a form of bonding the bonding member to the electrode member is at least one of impregnation with the gas diffusion layer and bonding to the membrane electrode assembly (which will hereinafter be suitably referred to as an "MEA" in the present disclosure as well). Accordingly, high bondability and sealability are realized. In addition, since at least the outer circumferential end surface of the electrolyte membrane is coated with the bonding member, the electrolyte membrane is protected and reinforced such that deformation is curbed, and sealability is also improved. In the stacking direction of the electrode member, the thickness of the bonding member is equal to or larger than the thickness of the gas diffusion layer disposed on one surface of the membrane electrode assembly. Consequently, the strength and bondability of the bonding member are secured. Furthermore, durability can be enhanced by curbing deformation of the electrolyte membrane, and handleability is also improved. At least a portion on a surface of the bonding member in the thickness direction is coated with the gasket. Accordingly, when a fuel cell is constituted by stacking the fuel cell assembly, sealability can be enhanced. In addition, since stickiness (tackiness) of the bonding member between cells adjacent to each other is curbed, the bonding member is unlikely to leave traces on members to be stacked. Moreover, when some cells need to be repaired or replaced, the cells can be easily taken out, and therefore repairability is improved.

(2) According to a first method for manufacturing the fuel cell assembly of the present disclosure (which will hereinafter be suitably referred to as “a first manufacturing method of the present disclosure”) that is the first example of the method for manufacturing the fuel cell assembly having the constitution of the foregoing (1), in the gasket shaping step, the gasket is manufactured of solid rubber in advance. Since a step of manufacturing the gasket is separated from a step of integrating the electrode member, the gasket can be manufactured using solid rubber having a lower fluidity than a liquid material. Further, a hardening temperature of the solid rubber can be set regardless of a heat resistant temperature of the electrolyte membrane. Accordingly, the gasket can be manufactured at a high temperature in a short period of time. Therefore, according to the first manufacturing method of the present disclosure, the gasket having a high durability can be manufactured with high productivity. In addition, in the integrating step, the electrode member and the gasket are bonded to each other by melting and hardening the bonding member having a thermoplastic polymer. Accordingly, when the bonding member is disposed such that it comes into contact with the gas diffusion layer of the electrode member, firmer bondability and higher sealability can be realized by impregnating the bonding member with the gas diffusion layer.

(3) In a second method for manufacturing the fuel cell assembly of the present disclosure (which will hereinafter be suitably referred to as “a second manufacturing method of the present disclosure”) that is the second example of the method for manufacturing the fuel cell assembly having the constitution of the foregoing (1), the electrode member and the gasket are integrated using the bonding member that is a hardened product of a liquid composition having a thermoplastic polymer by injecting and hardening the liquid composition in a state in which the electrode member and the gasket are disposed inside the shaping mold. According to the second manufacturing method of the present disclosure, in addition to the operational effects exhibited by the foregoing first manufacturing method, manufacturing of the fuel cell assembly is made efficient, and therefore productivity can be further enhanced.

(4) In a form in which the fuel cell assembly of the present disclosure includes a separator, if main constituent elements of the cells including the separator are integrated by the bonding member, handling is facilitated when the fuel cell assembly is stacked, and therefore a stacking step can be simplified. In addition, misalignment of members at the time of stacking or the like is also unlikely to occur. Accordingly, workability is improved and productivity is improved. In addition, since the bonding member and the separator are bonded to each other, sealability is also improved.

(5) According to a third method for manufacturing the fuel cell assembly of the present disclosure (which will hereinafter be suitably referred to as “a third manufacturing method of the present disclosure”) that is the first example of the method for manufacturing the fuel cell assembly including the separator having the constitution of the foregoing (4), the electrode member, the gasket, and the bonding member are disposed on a surface of the separator, and the bonding member is melted and hardened. Therefore, in addition to the operational effects exhibited by the first manufacturing method described in the foregoing (2), the electrode member, the gasket, and the separator can be easily integrated.

(6) According to a fourth method for manufacturing the fuel cell assembly of the present disclosure (which will hereinafter be suitably referred to as “a fourth manufacturing method of the present disclosure”) that is the second example of the method for manufacturing the fuel cell assembly including the separator having the constitution of the foregoing (4), a liquid composition having a thermoplastic polymer is injected and hardened in a state in which the electrode member and the gasket are disposed on a surface of the separator. Therefore, in addition to the operational effects exhibited by the second manufacturing method described in the foregoing (3), the electrode member, the gasket, and the separator can be easily integrated.

DESCRIPTION OF EMBODIMENTS

First Embodiment

[Constitution of Fuel Cell Assembly]

Figure 1:
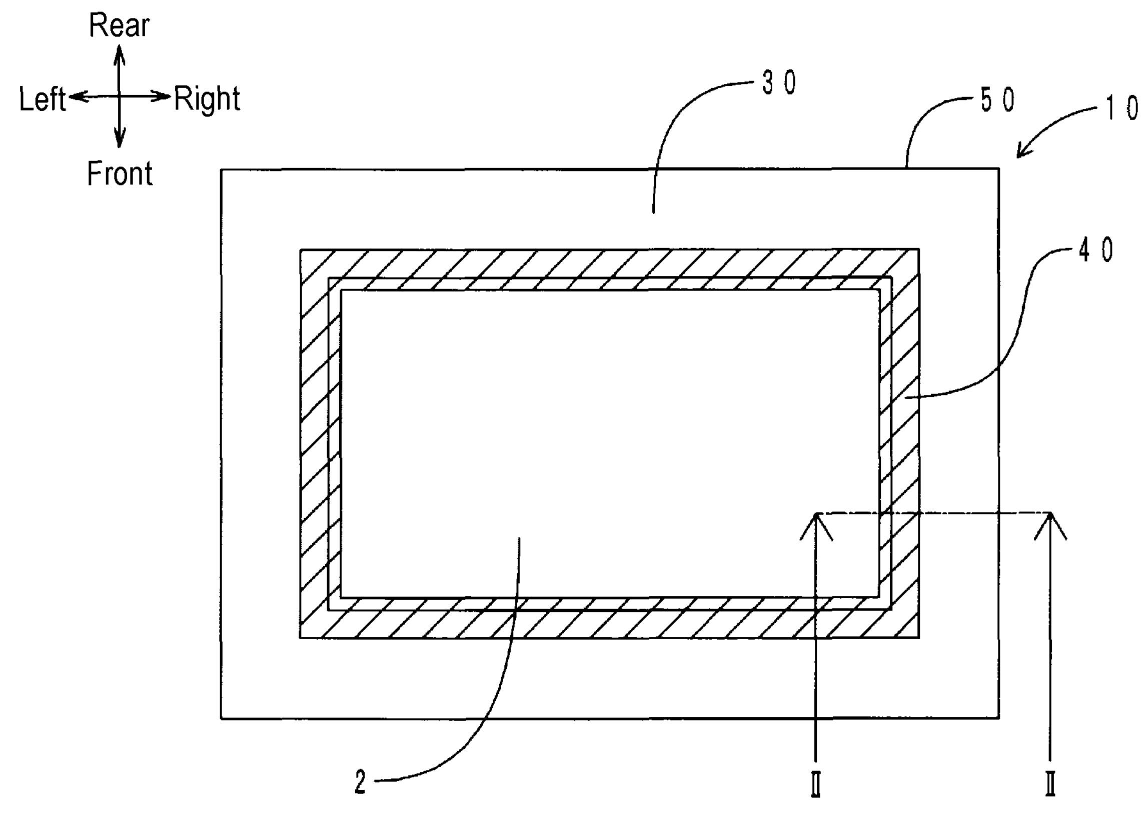
FIG. 1 is a top view of a fuel cell assembly of a first embodiment.
Figure 2:
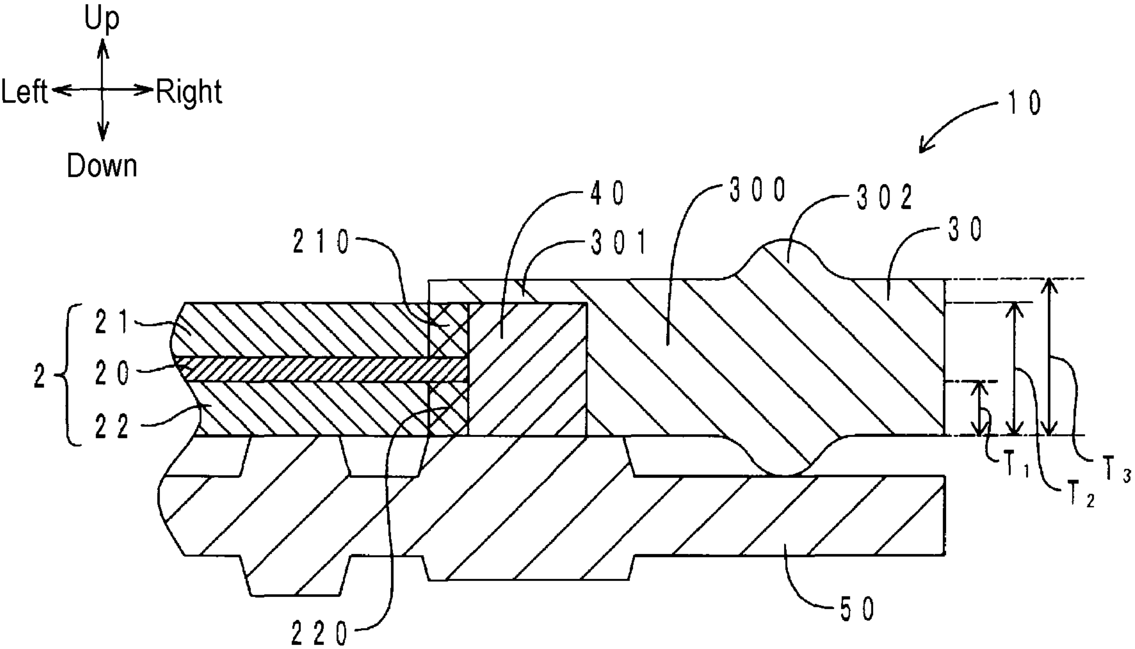
FIG. 2 is a cross-sectional view along II-II in FIG. 1.

First, a constitution of a fuel cell assembly of the present embodiment will be described. FIG. 1 illustrates a top view of the fuel cell assembly of the present embodiment. FIG. 2 illustrates a cross-sectional view along II-II in FIG. 1. In azimuths in the diagrams, forward, rearward, leftward, and rightward directions indicate a surface direction of each member, and an upward-downward direction indicates a thickness direction and a stacking direction of each member. In FIG. 1, for the sake of convenience of description, stacked members are illustrated transparently, and bonding members are illustrated with hatching. As illustrated in FIGS. 1 and 2, a fuel cell assembly 10 includes an electrode member 2, a gasket 30, a bonding member 40, and a separator 50.

The separator 50 is a carbon bipolar plate and exhibits a rectangular thin plate shape. The electrode member 2, the gasket 30, and the bonding member 40 are disposed on an upper surface of the separator 50. A flow channel having an uneven shape is formed in each of regions on the upper surface and the lower surface of the separator 50 overlapping the electrode member 2.

The electrode member 2 exhibits a rectangular thin membrane shape. The electrode member 2 is constituted of an MEA 20, and a pair of upper gas diffusion layer 21 and lower gas diffusion layer 22 disposed on both surfaces thereof in the thickness direction. The sizes (surface areas) of the MEA 20, the upper gas diffusion layer 21, and the lower gas diffusion layer 22 in the surface direction are the same. The MEA 20 is constituted of an electrolyte membrane, and a pair of electrode catalyst layers disposed on both surfaces thereof in the thickness direction. The electrolyte membrane is a perfluorinated sulfonic acid membrane, and the electrode catalyst layer has carbon particles carrying a catalyst including platinum. The constitutions of the upper gas diffusion layer 21 and the lower gas diffusion layer 22 are the same, and the upper gas diffusion layer 21 and the lower gas diffusion layer 22 each have carbon paper. The upper gas diffusion layer 21 has an upper impregnated part 210 with which the bonding member 40 is impregnated. The upper impregnated part 210 is disposed in an outer circumferential end part of the upper gas diffusion layer 21. Similarly, the lower gas diffusion layer 22 also has a lower impregnated part 220 with which the bonding member 40 is impregnated. The lower impregnated part 220 is disposed in an outer circumferential end part of the lower gas diffusion layer 22.

The gasket 30 exhibits a frame shape when viewed from above and is disposed on the outward side of the electrode member 2. The gasket 30 is made of a crosslinking substance with a rubber composition having an EPDM. The gasket 30 has a main body part 300 and an overlapping part 301. The main body part 300 has two lip parts 302 disposed on the outward side of a frame and protruding in the thickness direction. Apex parts of the two lip parts 302 exhibit a curved surface shape. The overlapping part 301 is disposed on the inward side of the frame and extends from the main body part 300 such that an upper surface of the bonding member 40 and an upper surface outer edge part of the electrode member 2 (a region corresponding to the upper impregnated part 210 and the lower impregnated part 220) are coated therewith. The gasket 30 comes into resilient-contact with a separator of another fuel cell assembly which is stacked when a fuel cell is constituted.

The bonding member 40 exhibits a frame shape when viewed from above and is disposed on the outward side of the electrode member 2. The bonding member 40 is disposed between the electrode member 2 and the gasket 30 in the surface direction. A thickness $T_2$ of the bonding member 40 is the same as the thickness of the electrode member 2 and is larger than a thickness $T_1$ of each of the upper gas diffusion layer 21 and the lower gas diffusion layer 22. The upper surface of the bonding member 40 is coated with the overlapping part 301 of the gasket 30. A total thickness $T_3$ of the overlapping part 301 of the gasket 30 and the bonding member 40 is larger than the thickness of the electrode member 2. The bonding member 40 has an olefin-based thermoplastic resin denatured by acid (which will hereinafter be suitably referred to as "an acid denatured olefin-based thermoplastic resin"). The melting point of an acid denatured olefin-based thermoplastic resin is approximately 130° C. An acid denatured olefin-based thermoplastic resin has bondability. As described above, a portion of the bonding member 40 is impregnated with the upper impregnated part 210 of the upper gas diffusion layer 21 and the lower impregnated part 220 of the lower gas diffusion layer 22. Furthermore, the bonding member 40 is bonded to contact members, specifically, an outer circumferential end surface of the MEA 20 including an electrolyte membrane, the gasket 30, and the separator 50. In this way, the electrode member 2, the gasket 30, and the separator 50 are integrated by the bonding member 40.

[Method for Manufacturing Fuel Cell Assembly]

Next, a method for manufacturing the fuel cell assembly of the present embodiment will be described. The method for manufacturing the fuel cell assembly of the present embodiment has a gasket shaping step, a disposing step, and an integrating step.

(1) Gasket Shaping Step

Figure 3:
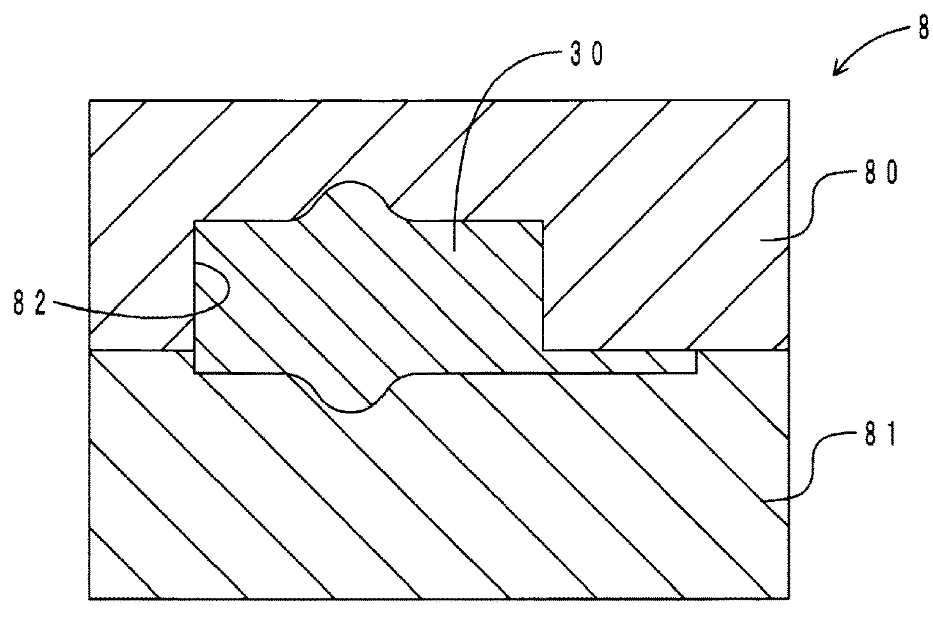
FIG. 3 is a schematic cross-sectional view of a shaping mold at the time of shaping a gasket.

In this step, the gasket 30 is shaped by performing injection molding of a rubber composition having an EPDM. FIG. 3 illustrates a schematic cross-sectional view of a shaping mold at the time of shaping a gasket. All the following drawings including FIG. 3 correspond to FIG. 2 and illustrate parts corresponding to those of the cross section along II-II in FIG. 1. As illustrated in FIG. 3, a shaping mold 8 includes an upper mold 80 and a lower mold 81. A cavity 82 having a shape mold-symmetrical with the gasket 30 is defined by joining the upper mold 80 and the lower mold 81. First, the shaping mold 8 is subjected to mold clamping, and a rubber composition which has been heated to approximately 100° C. in advance is injected into the cavity 82. After crosslinking is performed while being held in this state at 170° C. for 10 minutes, the shaping mold 8 is subjected to mold opening, and the gasket 30 is taken out.

(2) Disposing Step

Figure 4:
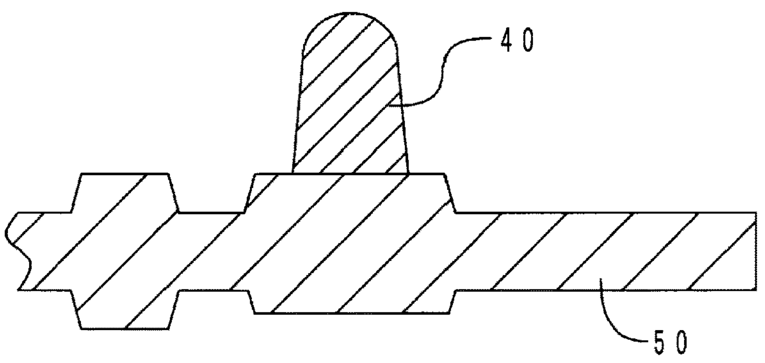
FIG. 4 is a schematic cross-sectional view of a separator to which a bonding member is applied.
Figure 5:
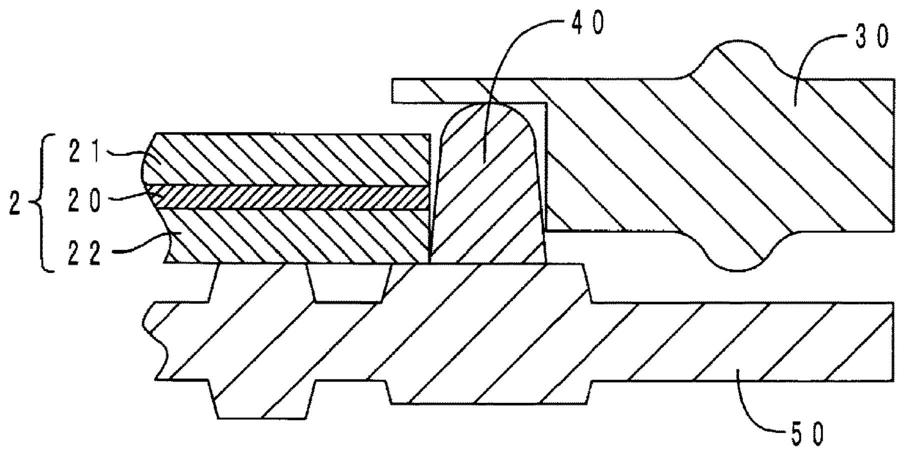
FIG. 5 is a schematic cross-sectional view of each member in a disposing step.

In this step, the electrode member 2, the molded gasket 30, and the bonding member 40 are disposed on the upper surface of the separator 50. FIG. 4 illustrates a schematic cross-sectional view of the separator to which the bonding member is applied. FIG. 5 illustrates a schematic cross-sectional view of each member in the disposing step. First, as illustrated in FIG. 4, the bonding member 40 which has been heated to a temperature of 150° C. or higher such that it has sufficient fluidity is applied at a predetermined position on the upper surface of the separator 50 in a frame shape using a dispenser. Next, as illustrated in FIG. 5, on the upper surface of the separator 50, the electrode member 2 is disposed on the inward side of the bonding member 40, and the gasket 30 is disposed on the outward side of the bonding member 40.

(3) Integrating Step

Figures 6, 7, 8:
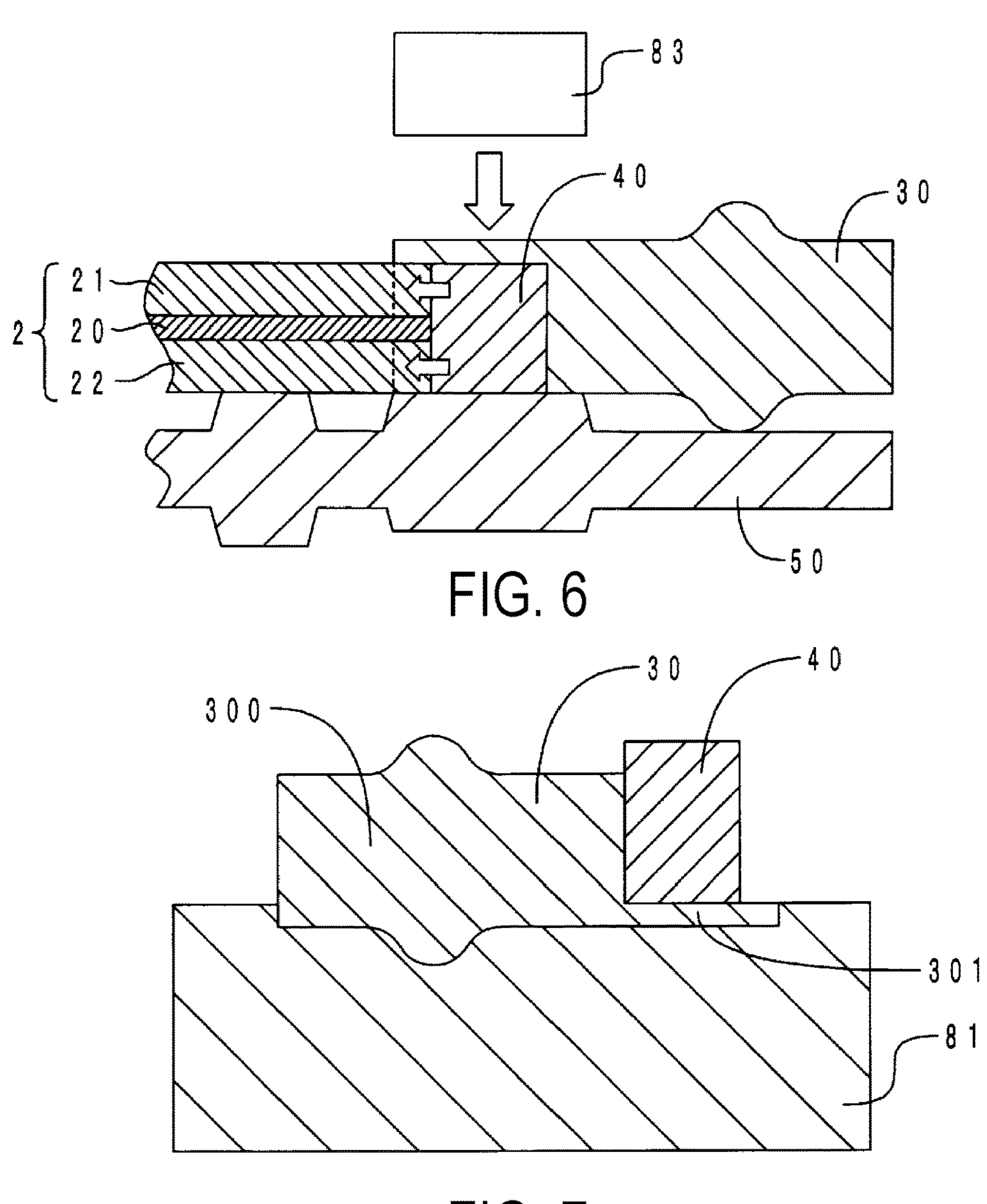
FIG. 6 is a schematic cross-sectional view of each member in an integrating step.
FIG. 7 is a schematic cross-sectional view of the gasket to which the bonding member is bonded in a bonding member fixing step of a method for manufacturing a fuel cell assembly of a second embodiment.
FIG. 8 is a schematic cross-sectional view of each member in the disposing step of the same manufacturing method.

In this step, the bonding member 40 is melted and then hardened, and the electrode member 2, the gasket 30, and the separator 50 are integrated using the bonding member 40. FIG. 6 illustrates a schematic cross-sectional view of each member in the integrating step. A stack of the separator 50, the electrode member 2, the gasket 30, and the bonding member 40 set in the foregoing disposing step is installed in a hot-press machine, and the bonding member 40 is pressed using a press member 83 heated to 140° C. as indicated by the downward outlined arrow in FIG. 6. Accordingly, the bonding member 40 melts, is impregnated with the outer circumferential end parts of the upper gas diffusion layer 21 and the lower gas diffusion layer 22 as indicated by the horizontal outlined arrows in FIG. 6, and is bonded to the outer circumferential end surface of the MEA 20, the gasket 30, and the separator 50. Thereafter, the stack is returned to an ordinary temperature so that the bonding member 40 is hardened, and the fuel cell assembly 10 in which the electrode member 2, the gasket 30, and the separator 50 are integrated with the bonding member 40 therebetween is thereby manufactured (refer to the foregoing FIG. 2).

[Operational Effects]

Next, operational effects of the fuel cell assembly and the method for manufacturing the same of the present embodiment will be described. In the fuel cell assembly 10 of the present embodiment, the gasket 30 is made of an EPDM. For this reason, the gasket 30 has excellent durability. In addition, since silicone rubber is not used, there is little degradation in sealability and contamination of the MEA 20 due to a decomposition product.

Since the bonding member 40 has an acid denatured olefin-based thermoplastic resin, bondability thereof is favorable. A portion of the bonding member 40 is impregnated with the upper gas diffusion layer 21 and the lower gas diffusion layer 22. Accordingly, high bondability and sealability are realized. The entire upper surface of the bonding member 40 is coated with the gasket 30. Further, a thickness $T_3$ of a part in which the gasket 30 and the bonding member 40 are stacked is larger than the thickness of the electrode member 2. Accordingly, when a fuel cell is constituted by stacking the fuel cell assembly 10, sealability can be enhanced. Since the entire upper surface of the bonding member 40 is coated with the gasket 30, stickiness (tackiness) of the bonding member 40 between cells adjacent to each other is curbed. Thus, the bonding member 40 is unlikely to leave traces on members to be stacked. In addition, when some cells need to be repaired or replaced, the cells can be easily taken out, and therefore repairability increases. The outer circumferential end surface of the electrolyte membrane of the MEA 20 is coated with the bonding member 40. Accordingly, the electrolyte membrane is protected and reinforced so that deformation is curbed and sealability is also improved. The thickness $T_2$ of the bonding member 40 is larger than the thickness $T_1$ of the lower gas diffusion layer 22. Accordingly, the strength and bondability of the bonding member 40 are secured. Furthermore, deformation of the electrolyte membrane is curbed, durability can be enhanced, and handleability is improved.

In the fuel cell assembly 10, the separator 50 is also integrated together with the electrode member 2 and the gasket 30. Accordingly, a step of stacking the fuel cell assembly 10 can be simplified, and misalignment or the like of the members is also unlikely to occur. Thus, workability is improved and productivity is improved. In addition, since the bonding member 40 and the separator 50 are bonded to each other, sealability is also improved.

The method for manufacturing the fuel cell assembly of the present embodiment is included in the concept of a first manufacturing method and a third manufacturing method of the present disclosure. According to the method for manufacturing the fuel cell assembly of the present embodiment, in the gasket shaping step, the gasket 30 is manufactured from a rubber composition having an EPDM in advance. Since a step of manufacturing the gasket 30 is separated from a step of integrating the electrode member 2, the gasket 30 can be manufactured using solid rubber having a lower fluidity than a liquid material. In addition, since the temperature at the time of shaping can be set to a high temperature around 200° C. regardless of the heat resistant temperature of the electrolyte membrane, the gasket 30 can be manufactured in a short period of time. In this manner, according to the method for manufacturing the fuel cell assembly of the present embodiment, the gasket 30 having a high durability can be manufactured with high productivity.

In the integrating step, the bonding member 40 is melted and hardened through hot pressing, and therefore the electrode member 2, the gasket 30, and the separator 50 can be easily integrated. Since the melting point of a thermal acid denatured olefin-based thermoplastic resin that is a material of the bonding member 40 is approximately 130° C. and hot pressing is performed at 140° C., there is little likelihood that the electrolyte membrane will be degenerated at the time of heating. The melted bonding member 40 is impregnated with the upper gas diffusion layer 21 and the lower gas diffusion layer 22 of the electrode member 2. Accordingly, bondability and sealability are enhanced.

Second Embodiment

The fuel cell assembly and the method for manufacturing the same of the present embodiment differ from those of the first embodiment in only a portion of the manufacturing method. That is, in the disposing step, instead of applying a bonding member to the separator, a bonding member is fixed to the molded gasket in advance. Here, description will be given mainly focusing on the difference.

Similar to the first embodiment, the method for manufacturing the fuel cell assembly of the present embodiment has the gasket shaping step, the disposing step, and the integrating step. Regarding the disposing step, a bonding member fixing step is added. In the present embodiment, the bonding member fixing step is performed at the beginning of the disposing step, and the bonding member is bonded to the gasket. FIG. 7 illustrates a schematic cross-sectional view of the gasket to which the bonding member is bonded in the bonding member fixing step. FIG. 8 illustrates a schematic cross-sectional view of each member in the disposing step.

First, as illustrated in FIG. 7, after the gasket shaping step (refer to the foregoing FIG. 3), in a state in which only the upper mold 80 is removed, the bonding member 40 is applied in a frame shape to the upper surface of a part corresponding to the overlapping part 301 of the obtained gasket 30. Similar to the disposing step of the first embodiment, the bonding member 40 is applied using a dispenser in a state of being heated to a temperature of 150° C. or higher such that it has sufficient fluidity. Then, the bonding member 40 is shaped into a predetermined shape using another shaping mold and is cooled. In this way, the gasket 30 with a bonding member is manufactured. Next, as illustrated in FIG. 8, the manufactured gasket 30 with a bonding member is disposed on the upper surface of the separator 50 in a reversed manner, and the electrode member 2 is disposed on the inward side of the bonding member 40. Then, similar to the integrating step of the first embodiment, the bonding member 40 is melted and then hardened through hot pressing, and the electrode member 2, the gasket 30, and the separator 50 are integrated using the bonding member 40.

According to the method for manufacturing the fuel cell assembly of the present embodiment, in the bonding member fixing step, the bonding member 40 is fixed to a surface of the gasket 30 in advance. Consequently, since the gasket 30 is reinforced, in the next integrating step, handleability at the time of disposing the gasket 30 is improved. In addition, since the electrode member 2 can be disposed in accordance with the frame of the bonding member 40, positioning at the time of disposing the electrode member 2 is facilitated.

Third Embodiment

The fuel cell assembly and the method for manufacturing the same of the present embodiment differ from those of the first embodiment in shapes of the bonding member, the gasket, and the like, and in shaping the bonding member through injection molding. Here, description will be given mainly focusing on the difference.

[Constitution of Fuel Cell Assembly]

Figures 9, 10, 11:
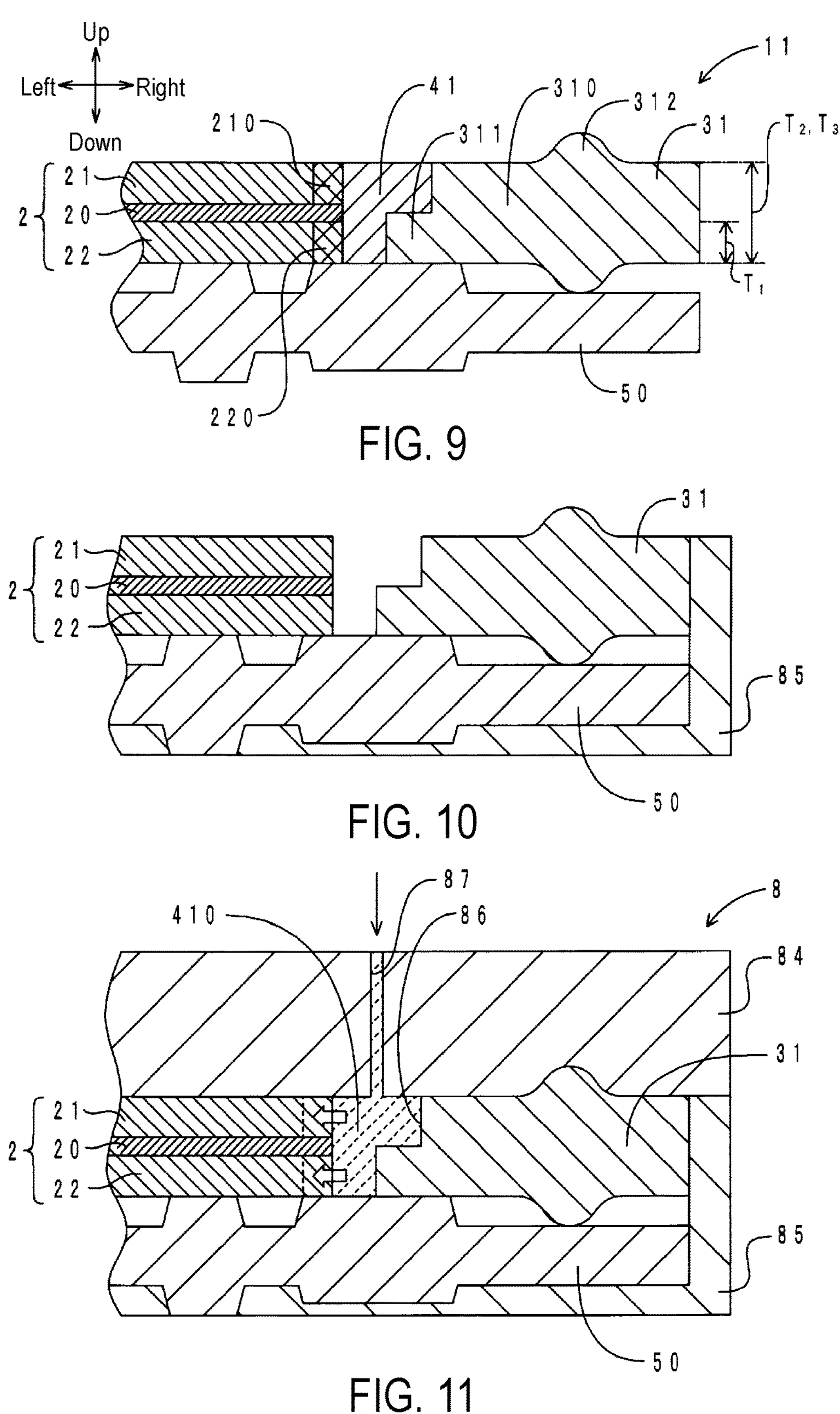
FIG. 9 is a partial cross-sectional view of a fuel cell assembly of a third embodiment.
FIG. 10 is a schematic cross-sectional view of each member in the disposing step of a method for manufacturing a fuel cell assembly of the third embodiment.
FIG. 11 is a schematic cross-sectional view of the shaping mold in the integrating step of the same manufacturing method.

First, a constitution of the fuel cell assembly of the present embodiment will be described. FIG. 9 illustrates a partial cross-sectional view of a fuel cell assembly of the present embodiment. In FIG. 9, parts corresponding to those in FIG. 2 are indicated by the same reference signs. As illustrated in FIG. 9, a fuel cell assembly 11 includes the electrode member 2, a gasket 31, a bonding member 41, and the separator 50.

The gasket 31 exhibits a frame shape when viewed from above and is disposed on the outward side of the electrode member 2. The gasket 31 is made of the same material as that of the gasket 30 of the first embodiment, that is, a crosslinking substance with a rubber composition having an EPDM. The gasket 31 has a main body part 310 and an overlapping part 311. The main body part 310 has two lip parts 312 disposed on the outward side of the frame and protruding in the thickness direction. Apex parts of the two lip parts 312 exhibit a curved surface shape. The overlapping part 311 is disposed on the inward side of the frame and is stacked in a portion of the bonding member 41.

The bonding member 41 exhibits a frame shape when viewed from above and is disposed on the outward side of the electrode member 2. The bonding member 41 is disposed between the electrode member 2 and the gasket 31 in the surface direction. A cross section of the bonding member 41 in the thickness direction exhibits an L-shape, and a part protruding to the outward side is stacked in the overlapping part 311 of the gasket 31. A portion on the lower surface of the bonding member 41 is coated with the gasket 31. The upper surface of the bonding member 41 is flush with the main body part 310 excluding a lip part 312 of the gasket 31. The total thickness $T_3$ of the overlapping part 311 of the gasket 31 and the bonding member 41 is the same as the thickness of the electrode member 2. The thickness $T_2$ of the bonding member 41 in contact with electrode member 2 is the same as the thickness of the electrode member 2 and is larger than the thickness $T_1$ of each of the upper gas diffusion layer 21 and the lower gas diffusion layer 22. The bonding member 41 is made of the same material as that of the bonding member 40 of the first embodiment and has an acid denatured olefin-based thermoplastic resin. A portion of the bonding member 41 is impregnated with the upper impregnated part 210 of the upper gas diffusion layer 21 and the lower impregnated part 220 of the lower gas diffusion layer 22 in the electrode member 2. Furthermore, the bonding member 41 is bonded to contact members, specifically, the outer circumferential end surface of the MEA 20 including an electrolyte membrane, the gasket 31, and the separator 50. In this way, the electrode member 2, the gasket 31, and the separator 50 are integrated by the bonding member 41.

[Method for Manufacturing Fuel Cell Assembly]

Next, the method for manufacturing the fuel cell assembly of the present embodiment will be described. The method for manufacturing the fuel cell assembly of the present embodiment has the gasket shaping step, the disposing step, and the integrating step. Since the gasket shaping step is similar to that of the first embodiment, description thereof will be omitted.

(1) Disposing Step

FIG. 10 illustrates a schematic cross-sectional view of each member in the disposing step. As illustrated in FIG. 10, in this step, the separator 50 is disposed in a lower mold 85 of the shaping mold, and the electrode member 2 and the gasket 31 are disposed at predetermined positions on the upper surface of the separator 50. A space for injecting a liquid composition that is a material of the bonding member 41 in the next integrating step is disposed between the electrode member 2 and the gasket 31 in the surface direction.

(2) Integrating Step

In this step, a liquid composition is injected and hardened in the shaping mold, and the electrode member 2, the gasket 31, and the separator 50 are integrated using the bonding member 41 that is a hardened product of the liquid composition. FIG. 11 illustrates a schematic cross-sectional view of the shaping mold in the integrating step. As illustrated in FIG. 11, the shaping mold 8 includes an upper mold 84 and the lower mold 85. The separator 50, the electrode member 2, and the gasket 31 are disposed in the lower mold 85. A cavity 86 having a shape mold-symmetrical with the bonding member 41 is defined by joining the upper mold 84 and the lower mold 85. The upper mold 84 has a gate 87 connected to the cavity 86.

First, the shaping mold 8 is subjected to mold clamping, and a liquid composition 410 having an acid denatured olefin-based thermoplastic resin is injected into the cavity 86 from a nozzle of an injection molding machine through a runner (not illustrated) and the gate 87. The liquid composition 410 is heated to approximately 140° C. The injected liquid composition is impregnated with the outer circumferential end parts of the upper gas diffusion layer 21 and the lower gas diffusion layer 22 as indicated by the outlined arrows in FIG. 11, and is bonded to the outer circumferential end surface of the MEA 20, the gasket 31, and the separator 50. Thereafter, the shaping mold 8 is cooled so that the liquid composition 410 is hardened and becomes the bonding member 41. In this way, the fuel cell assembly 11 in which the electrode member 2, the gasket 31, and the separator 50 are integrated with the bonding member 41 therebetween is manufactured (refer to the foregoing FIG. 9).

[Operational Effects]

Next, operational effects of the fuel cell assembly and the method for manufacturing the same of the present embodiment will be described. The method for manufacturing the fuel cell assembly of the present embodiment is included in the concept of a second manufacturing method and a fourth manufacturing method of the present disclosure. According to the method for manufacturing the fuel cell assembly of the present embodiment, in the integrating step, the liquid composition 410 having a thermal acid denatured olefin-based thermoplastic resin is injected and hardened in a state in which the separator 50, the electrode member 2, and the gasket 31 are disposed inside the shaping mold 8. Therefore, the electrode member 2, the gasket 31, and the separator 50 can be easily integrated. Since injection molding of the liquid composition 410 is performed at approximately 140° C., there is little likelihood that the electrolyte membrane will be degenerated at the time of heating. The liquid composition 410 is impregnated with the upper gas diffusion layer 21 and the lower gas diffusion layer 22 of the electrode member 2. Accordingly, bondability and sealability are enhanced. According to the method for manufacturing the fuel cell assembly of the present embodiment, manufacturing of the fuel cell assembly 11 is made efficient, and therefore productivity can be further enhanced.

In the method in which the bonding member is applied in advance as in the first and second embodiments, since the amount of the bonding member is limited, when a gap between the gasket and the electrode member is large, when variation in size of the gap is large, and the like, there is a likelihood that the bonding member will become insufficient. In this regard, according to injection molding of the present embodiment, since the liquid composition flows and fills the gap between the gasket 31 and the electrode member 2 without excess or deficiency, it is effective when the gap is large, when variation in size of the gap is large, and the like.

Fourth Embodiment

Figure 12:
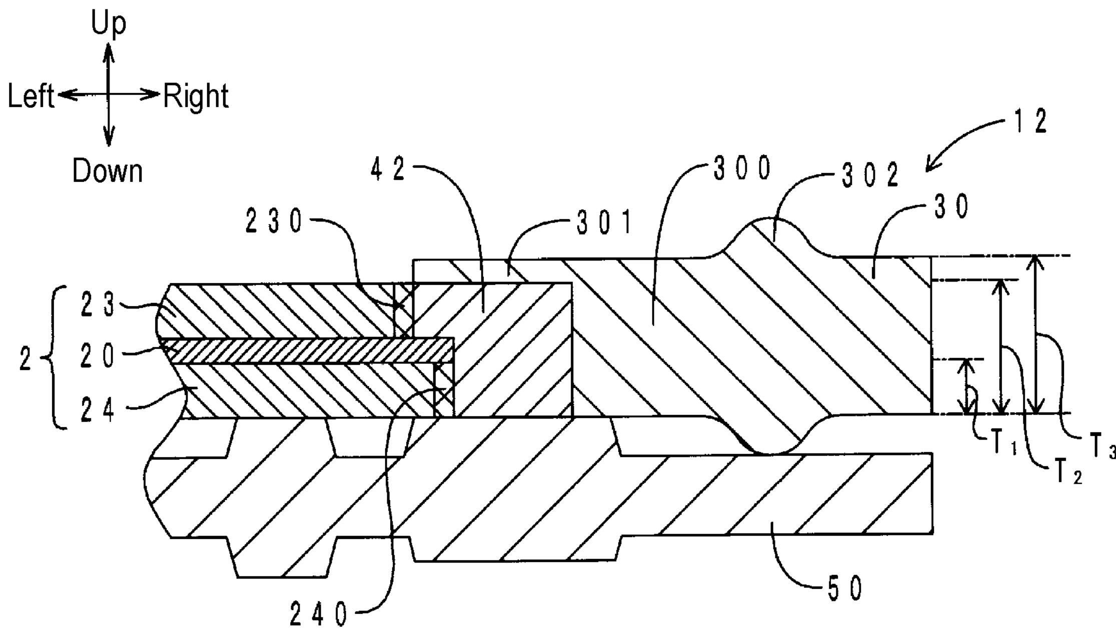
FIG. 12 is a partial cross-sectional view of a fuel cell assembly of a fourth embodiment.

The fuel cell assembly and the method for manufacturing the same of the present embodiment differ from those of the first embodiment in the size of the gas diffusion layer in the electrode member and the bonding form of the bonding member. Here, description will be given mainly focusing on the difference. FIG. 12 illustrates a partial cross-sectional view of a fuel cell assembly of the present embodiment. In FIG. 12, parts corresponding to those in FIG. 2 are indicated by the same reference signs. As illustrated in FIG. 12, a fuel cell assembly 12 includes the electrode member 2, the gasket 30, a bonding member 42, and the separator 50.

The electrode member 2 is constituted of the MEA 20, and a pair of upper gas diffusion layer 23 and lower gas diffusion layer 24 disposed on both surfaces thereof in the thickness direction. The constitutions of the upper gas diffusion layer 23 and the lower gas diffusion layer 24 are the same, but the sizes (surface areas) thereof in the surface direction are different from each other. That is, the surface area of the upper gas diffusion layer 23 is smaller than the surface area of the lower gas diffusion layer 24. For this reason, when the electrode member 2 is viewed from above, an outer edge part of the MEA 20 is exposed. An upper impregnated part 230 with which the bonding member 42 has been impregnated is disposed in the outer circumferential end part of the upper gas diffusion layer 23. Similarly, a lower impregnated part 240 with which the bonding member 42 has been impregnated is also disposed in the outer circumferential end part of the lower gas diffusion layer 24.

The bonding member 42 exhibits a frame shape when viewed from above and is disposed on the outward side of the electrode member 2. The thickness $T_2$ of the bonding member 42 is the same as the thickness of the electrode member 2 and is larger than the thickness $T_1$ of each of the upper gas diffusion layer 23 and the lower gas diffusion layer 24. The upper surface of the bonding member 42 is coated with the overlapping part 301 of the gasket 30. The total thickness $T_3$ of the overlapping part 301 of the gasket 30 and the bonding member 42 is larger than the thickness of the electrode member 2. The bonding member 42 is made of the same material as that of the bonding member 40 of the first embodiment and has an acid denatured olefin-based thermoplastic resin. A portion of the bonding member 42 is impregnated with the upper impregnated part 230 of the upper gas diffusion layer 23, and the lower impregnated part 240 of the lower gas diffusion layer 24 in the electrode member 2. In addition, the bonding member 42 is bonded to the upper surface of the MEA 20 exposed on the upper gas diffusion layer 23 side. Moreover, the bonding member 42 is also bonded to the outer circumferential end surface of the MEA 20 including the electrolyte membrane, the gasket 30, and the separator 50. In this way, the electrode member 2, the gasket 30, and the separator 50 are integrated by the bonding member 42. The method for manufacturing the fuel cell assembly 12 is the same as the manufacturing method of the first embodiment.

In the fuel cell assembly 12 of the present embodiment, the surface area of the upper gas diffusion layer 23 is smaller than the surface area of the lower gas diffusion layer 24, and the bonding member 42 is bonded to the upper surface of the MEA 20 exposed upward. By employing such a constitution, cross leakage which is likely to occur in the outer circumferential end part of the electrode member 2 can be curbed. As a result, degradation in power generation performance, deterioration in electrolyte membrane, and the like are curbed.

Fifth Embodiment

Figure 13:
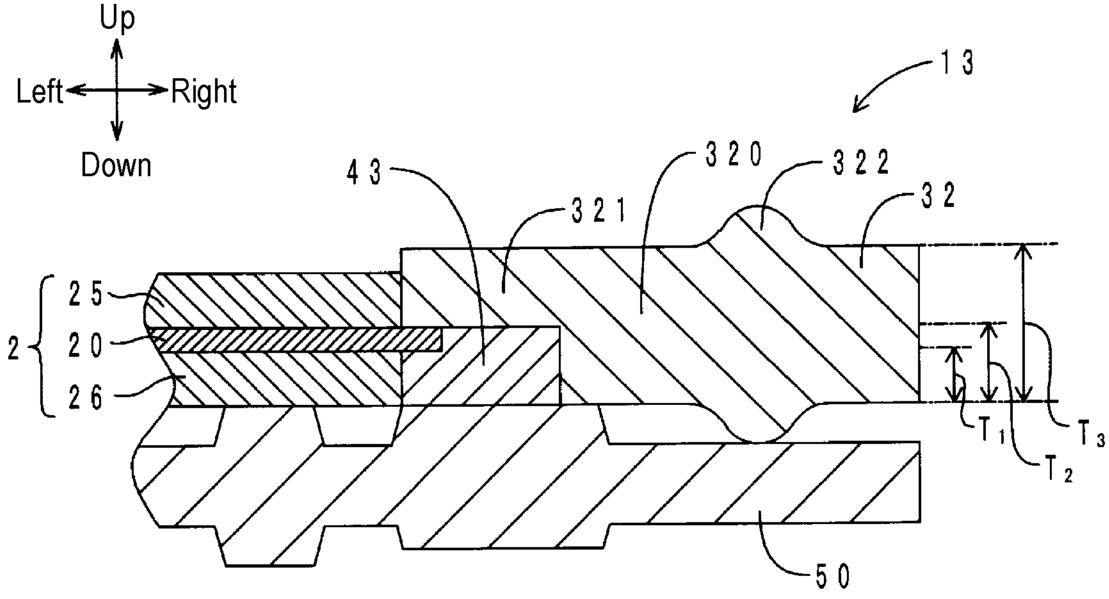
FIG. 13 is a partial cross-sectional view of a fuel cell assembly of a fifth embodiment.

The fuel cell assembly and the method for manufacturing the same of the present embodiment differ from those of the first embodiment in the size of the gas diffusion layer in the electrode member, the bonding form of the bonding member, the shape of the gasket, and the like. Here, description will be given mainly focusing on the difference. FIG. 13 illustrating a partial cross-sectional view of a fuel cell assembly of the present embodiment. In FIG. 13, parts corresponding to those in FIG. 2 are indicated by the same reference signs. As illustrated in FIG. 13, a fuel cell assembly 13 includes the electrode member 2, a gasket 32, a bonding member 43, and the separator 50.

The electrode member 2 is constituted of the MEA 20, and a pair of upper gas diffusion layer 25 and lower gas diffusion layer 26 disposed on both surfaces thereof in the thickness direction. The constitutions and the sizes of the upper gas diffusion layer 25 and the lower gas diffusion layer 26 are the same. The size (surface area) of the MEA 20 in the surface direction is larger than those of the upper gas diffusion layer 25 and the lower gas diffusion layer 26. For this reason, when the electrode member 2 is viewed from above, the outer edge part of the MEA 20 protrudes to the outward side and is exposed.

The bonding member 43 exhibits a frame shape when viewed from above and is disposed on the outward side of the electrode member 2. The thickness $T_2$ of the bonding member 43 is the same as the total thickness of the MEA 20 and the lower gas diffusion layer 26 and is larger than the thickness $T_1$ of the lower gas diffusion layer 26. The bonding member 43 is made of the same material as that of the bonding member 40 of the first embodiment and has an acid denatured olefin-based thermoplastic resin. The bonding member 43 is bonded to the lower surface of the MEA 20 protruding to the outward side of the electrode member 2, the outer circumferential end surface, and the outer circumferential end surface of the lower gas diffusion layer 26. The bonding member 43 is also bonded to the gasket 32 and the separator 50. In this way, the electrode member 2, the gasket 32, and the separator 50 are integrated by the bonding member 43.

The gasket 32 exhibits a frame shape when viewed from above and is disposed on the outward side of the electrode member 2. The gasket 32 is made of the same material as that of the gasket 30 of the first embodiment, that is, a crosslinking substance with a rubber composition having an EPDM. The gasket 32 has a main body part 320 and an overlapping part 321. The main body part 320 has two lip parts 322 disposed on the outward side of the frame and protruding in the thickness direction. Apex parts of the two lip parts 322 exhibit a curved surface shape. The overlapping part 321 is disposed on the inward side of the frame, and the upper surface of the bonding member 43, the outer circumferential end surface of the upper gas diffusion layer 25, and the upper surface of the MEA 20 protruding to the outward side of the electrode member 2 are coated therewith. The total thickness $T_3$ of the overlapping part 321 of the gasket 32 and the bonding member 43 is larger than the thickness of the electrode member 2. The method for manufacturing the fuel cell assembly 13 is the same as the manufacturing method of the first embodiment.

In the fuel cell assembly 13 of the present embodiment, the surface area of the MEA 20 is larger than the surface areas of the upper gas diffusion layer 25 and the lower gas diffusion layer 26, and the outer edge part of the MEA 20 protrudes to the outward side. The bonding member 43 is bonded to the lower surface of the exposed MEA 20, the outer circumferential end surface, and the outer circumferential end surface of the lower gas diffusion layer 26. Here, the thickness $T_2$ of the bonding member 43 is the same as the total thickness of the MEA 20 and the lower gas diffusion layer 26 and is larger than the thickness $T_1$ of the lower gas diffusion layer 26. On the other hand, the upper surface of the exposed MEA 20 and the outer circumferential end surface of the upper gas diffusion layer 25 are coated with the gasket 32. By employing such a constitution, high sealability of the electrode member 2 is realized. In addition, the strength and bondability of the bonding member 43 are secured, and deformation of the electrolyte membrane is curbed.

Other Embodiments

Hereinabove, embodiments of the fuel cell assembly and the method for manufacturing the same according to the present disclosure have been described. However, the embodiments are not limited to the foregoing forms. It is also possible to perform various modified forms and improved forms which can be performed by those skilled in the art.

The fuel cell assembly of the present disclosure need only have a predetermined electrode member, a predetermined gasket, and a predetermined bonding member as essential constituent elements. In the fuel cell assembly of the present disclosure, other constituent elements may be present in addition to these essential constituent elements, and the kinds thereof are not limited. In the foregoing embodiments, the fuel cell assembly and the method for manufacturing the same according to the present disclosure has been described in a form including a separator. However, the fuel cell assembly and the method for manufacturing the same according to the present disclosure may be performed in a form including no separator. The first manufacturing method or the second manufacturing method of the present disclosure also corresponds to the method for manufacturing the fuel cell assembly of the present disclosure having a form including no separator. In a form in which the fuel cell assembly includes a separator, the separator is not necessarily integrated by the bonding member. For example, the fuel cell assembly may be constituted by stacking an electrode member with a predetermined gasket in which the electrode member and the gasket are integrated by the bonding member in a separator.

[Electrode Member]

In the constituent elements of the fuel cell assembly of the present disclosure, the electrode member has an MEA and a gas diffusion layer. The MEA has an electrolyte membrane, and a pair of electrode catalyst layers disposed on both surfaces of the electrolyte membrane. A proton-conducting ion-exchange membrane used for fuel batteries need only be used as the electrolyte membrane. The electrode catalyst layer need only be constituted to include a conductive carrier or the like carrying a catalyst such as platinum or a platinum alloy. The electrode catalyst layer is not necessarily formed on the entire surface of the electrolyte membrane. The electrode catalyst layer need only be suitably formed on a surface of the electrolyte membrane in accordance with a power generation region of the MEA. A carbon porous body such as a carbon paper or a carbon cloth, or a metal porous body such as a metal mesh need only be used as the gas diffusion layer.

The gas diffusion layer need only be disposed on one surface or both surfaces of the MEA in the thickness direction. The gas diffusion layer may be a single layer or two or more layers. When the gas diffusion layer is disposed on both surfaces of the MEA in the thickness direction, the thicknesses, the sizes (surface areas) in the surface direction, and the like of the gas diffusion layers may be the same or different on a surface and the other surface in the thickness direction. For example, when the surface area of the gas diffusion layer disposed on a surface is smaller than the surface area of the gas diffusion layer disposed on the other surface, the outer edge part of the MEA is exposed on a side of the gas diffusion layer having a smaller surface area. In this case, from the viewpoint of protecting the electrolyte membrane, it is desirable that the bonding member be bonded to the exposed outer edge part of the MEA. In addition, when the surface area of the MEA is larger than the surface area of the gas diffusion layer as well, the outer edge part of the MEA is exposed. In this case as well, from the viewpoint of protecting the electrolyte membrane, it is desirable that the bonding member be bonded to the exposed outer edge part of the MEA.

[Gasket]

The gasket is manufactured using solid rubber. For example, it may be manufactured by performing injection molding, press shaping, or the like of a rubber composition having solid rubber as a rubber component. It is desirable to use rubber other than silicone rubber as the solid rubber, and examples thereof include EPDM, fluorine rubber, butyl rubber (IIR), ethylene-propylene rubber (EPM), acrylonitrile-butadiene rubber (NBR), hydrogenated acrylonitrile-butadiene rubber (H-NBR), styrene-butadiene rubber (SBR), and butadiene rubber (BR). In consideration of durability and the like of the gasket, EPDM or fluorine rubber is preferable. In addition to the rubber component, the rubber composition may include a crosslinking agent, a crosslinking aid, a plasticizer, a reinforcing agent, an anti-aging agent, a processing aid, or the like. It is desirable to use organic peroxide as a crosslinking agent because it does not include any volatile component such as sulfur. In the foregoing embodiments, from the viewpoint of enhancing the sealability at the time of stacking the fuel cell assembly, lip parts are disposed in the gasket. Including the presence or absence of lip parts, the shape, the thickness, and the like of the gasket may be suitably determined.

[Separator]

Regarding a material of the separator, stainless steel, titanium, copper, magnesium, aluminum, carbon, graphite, ceramics, a conductive resin (a thermoplastic resin or a thermosetting resin having carbon, graphite, polyacrylonitrile carbon fibers, or the like), or the like can be used. In addition, on a surface of the main body part made of the material, a carbon thin membrane such as a diamond-like carbon membrane (DLC membrane) or a graphite membrane may be formed through treatment such as physical vapor deposition (PVD) or chemical vapor deposition (CVD). Including a flow channel, a penetration hole, and the like to be formed, the constitution of the separator is not limited.

[Bonding Member]

The bonding member need only have a thermoplastic polymer and be bonded to at least the electrode member and the gasket. In consideration of the operating temperature of the fuel cell and the heat resistant temperature of the electrolyte membrane, it is desirable to select a thermoplastic polymer having a melting point of 70° C. to 170° C. A thermoplastic polymer having a melting point of 140° C. or lower is more preferable. Regarding a thermoplastic polymer having a relatively low melting point, an olefin-based thermoplastic resin such as a polyethylene or polypropylene can be used. Among these, from the viewpoint of favorable bondability, an acid denatured olefin-based thermoplastic resin is preferable. An acid denatured olefin-based thermoplastic resin denotes an olefin-based thermoplastic resin which has been denatured by acid, acid anhydride, acid ester, metallocene, or the like. Denaturalization by acid may be performed by grafting an acid component onto an olefin-based thermoplastic resin, copolymerizing it, or combining these.

The shape of the bonding member is not particularly limited as long as it can be bonded to the electrode member and the gasket and integrate both. When the fuel cell assembly includes a separator, the bonding member may also be bonded to the separator, and the separator may be integrated with the electrode member and the gasket. The bonding member may be bonded to the electrode member by being impregnated with the gas diffusion layer or may be bonded to the electrode member by being bonded to the MEA, or both of these may be performed. When the bonding member is impregnated in the gas diffusion layer, bondability and sealability are improved. When the bonding member is bonded to the MEA, since the electrolyte membrane is protected by the bonding member, deformation, damage, or the like of the electrolyte membrane is curbed. When the bonding member is bonded to the MEA, it may be bonded to the electrolyte membrane of the MEA or may be bonded to the electrode catalyst layer disposed on a surface of the electrolyte membrane. In a form in which the bonding member is impregnated with the gas diffusion layer and is not bonded to both surfaces of the MEA in the thickness direction as well, at least the outer circumferential end surface of the electrolyte membrane is coated with the bonding member. Accordingly, the electrolyte membrane is protected and sealability is improved.

From the viewpoint of the strength and bondability of the bonding member, the thickness of the bonding member is equal to or larger than the thickness of the gas diffusion layer disposed on one surface of the MEA. In this specification, "a thickness" denotes a length of the electrode member in the stacking direction. When the thickness of the bonding member and the thickness of the gas diffusion layer are compared to each other, the bonding member is compared thereto with the thickness of a part in contact with the electrode member. For example, in the foregoing third embodiment, the thickness of the bonding member 41 varies in the inward and outward directions of the frame. In this case, the thickness $T_2$ of the part in contact with the electrode member 2 and the thickness $T_1$ of the gas diffusion layer (the lower gas diffusion layer 22 or the upper gas diffusion layer 21) are compared to each other. In addition, when a fuel cell is constituted by stacking the fuel cell assembly, from the viewpoint of enhancing the sealability, it is desirable that the thickness of a part in which the gasket and the bonding member are stacked in the stacking direction of the electrode member be equal to or larger than the thickness of the electrode member.

From the viewpoint of sealability and repairability of the fuel cell assembly, at least a portion on a surface of the bonding member in the thickness direction is coated with the gasket. A surface of the bonding member in the thickness direction may be the upper surface in the foregoing first embodiment or may be the lower surface in the foregoing third embodiment. A part to be coated with the gasket of the bonding member may be a surface or both surfaces thereof in the thickness direction or may be the entirety or a portion on a surface. Besides, the fuel cell assembly may be formed in a form in which a surface of the bonding member in the thickness direction is not entirely coated with the gasket. In this form, the gasket does not have an overlapping part (the overlapping part 301 in the first embodiment, the overlapping part 311 in the third embodiment, and the like) which extends in a manner of overlapping the bonding member from the main body part. Therefore, the shape of the gasket becomes simple, and the gasket is easily manufactured.

[Method for Manufacturing Fuel Cell Assembly]

The method for manufacturing the fuel cell assembly of the present disclosure is characterized in that the gasket is shaped in advance and the molded gasket and the electrode member are bonded and integrated utilizing melting and hardening of the thermoplastic polymer. In accordance with the difference in the method for supplying a bonding member having a thermoplastic polymer, the following forms (a) and (b) can be adopted.

(a) A method for manufacturing the fuel cell assembly including a gasket shaping step of shaping a gasket from solid rubber; a disposing step of disposing an electrode member that has a membrane electrode assembly having an electrolyte membrane and an electrode catalyst layer and a gas diffusion layer disposed on at least one surface of both surfaces of the membrane electrode assembly in a thickness direction, the molded gasket, and a bonding member that has a thermoplastic polymer; and an integrating step of integrating the electrode member and the gasket using the bonding member by melting and then hardening the bonding member.

(b) A method for manufacturing the fuel cell assembly including a gasket shaping step of shaping a gasket from solid rubber; a disposing step of disposing an electrode member that has a membrane electrode assembly having an electrolyte membrane and an electrode catalyst layer and a gas diffusion layer disposed on at least one surface of both surfaces of the membrane electrode assembly in a thickness direction, and the molded gasket inside a shaping mold; and an integrating step of integrating the electrode member and the gasket using a bonding member that is a hardened product of a liquid composition having a thermoplastic polymer by injecting the liquid composition into the shaping mold and hardening the liquid composition therein.

In the gasket shaping step, the gasket is shaped by holding the rubber composition having solid rubber as the rubber component at a predetermined temperature for a predetermined time. A known method such as injection molding or press shaping may be used for shaping the gasket.

In the disposing step, when the bonding member having a thermoplastic polymer is disposed, the bonding member may be disposed on a surface of the gasket or on a surface of a base material such as the separator. As in the foregoing second embodiment, if the bonding member is fixed to a surface of the gasket in advance, the gasket is reinforced. Therefore, handleability at the time of disposing the gasket is improved. In addition, since the electrode member can be disposed in accordance with the frame of the bonding member, positioning at the time of disposing the electrode member is facilitated. In the disposing step, the bonding member to be disposed may be a solid body or a liquid. Regarding a method for disposing a bonding member, brush coating, an applying method using a coater such as a dispenser, a spray, or the like, a method using a shaping mold, a method in which a bonding member is shaped in a frame-shaped sheet in advance and it is disposed, or the like can be used.

In the integrating step, when the bonding member is melted and hardened, a hot-press machine or the like may be used. Alternatively, when a liquid composition having a thermoplastic polymer is injected and hardened in the shaping mold, an injection molding machine or the like may be used. Including a form of injecting a liquid composition, when the bonding member is melted and bonded, it is not necessarily pressurized. If the bonding member is pressurized in a melted state, it is likely to be impregnated with the gas diffusion layer. The heating temperature for melting the bonding member may be suitably determined in consideration of the heat resistant temperature of the electrolyte membrane, the melting point of the thermoplastic polymer, the environmental temperature at which the fuel cell is used, and the like. For example, the heating temperature may be within a range of 110° C. to 150° C.

REFERENCE SIGNS LIST

10, 11, 12, 13 Fuel cell assembly
2 Electrode member
20 MEA
21, 23, 25 Upper gas diffusion layer
22, 24, 26 Lower gas diffusion layer
210, 230 Upper impregnated part
220, 240 Lower impregnated part
30, 31, 32 Gasket
300, 310, 320 Main body part
301, 311, 321 Overlapping part
302, 312, 322 Lip part
40, 41, 42, 43 Bonding member
410 Liquid composition
50 Separator
8 Shaping mold
80, 84 Upper mold
81, 85 Lower mold
82, 86 Cavity
83 Press member
87 Gate

What is claimed is:

1. A fuel cell assembly comprising:

an electrode member that has a membrane electrode assembly having an electrolyte membrane and an electrode catalyst layer, and a gas diffusion layer disposed on at least one surface of both surfaces of the membrane electrode assembly in a thickness direction;

a solid rubber gasket that, having a direction intersecting a stacking direction of the electrode member as a surface direction, is disposed in a frame shape on an outward side of the electrode member in the surface direction; and a bonding member that has a thermoplastic polymer, is disposed separately from the gasket in a frame shape on the outward side of the electrode member in the surface direction, is bonded to the electrode member and the gasket, and integrates the electrode member and the gasket, wherein a form of bonding the bonding member to the electrode member is at least one of impregnation with the gas diffusion layer and bonding to the membrane electrode assembly, wherein at least an outer circumferential end surface of the electrolyte membrane is coated with the bonding member, and wherein in the stacking direction of the electrode member, a thickness of the bonding member is equal to or larger than a thickness of the gas diffusion layer disposed on the one surface of the membrane electrode assembly, and at least a portion on a surface of the bonding member intersecting the thickness direction is coated with the gasket.

2. The fuel cell assembly according to claim 1, wherein the gas diffusion layer is disposed on both surfaces of the membrane electrode assembly in the thickness direction, and the bonding member is impregnated with at least one of the two gas diffusion layers.

3. The fuel cell assembly according to claim 1, wherein the gas diffusion layer is disposed on both surfaces of the membrane electrode assembly in the thickness direction, and when the electrode member is viewed in the stacking direction, sizes of the two gas diffusion layers in the surface direction differ from each other, and wherein the bonding member is bonded to the membrane electrode assembly exposed on the smaller gas diffusion layer side.

4. The fuel cell assembly according to claim 1, wherein when the electrode member is viewed in the stacking direction, a size of the membrane electrode assembly in the surface direction is larger than a size of the gas diffusion layer in the surface direction, and wherein the bonding member is bonded to at least a surface of the membrane electrode assembly protruding to the outward side.

5. The fuel cell assembly according to claim 1, wherein a thickness of a part in which the gasket and the bonding member are stacked in the stacking direction of the electrode member is equal to or larger than a thickness of the electrode member.

6. The fuel cell assembly according to claim 1 further comprising:

a separator that is stacked on the electrode member and the gasket, wherein the bonding member is bonded to the electrode member, the gasket, and the separator and integrates the electrode member, the gasket, and the separator.

7. The fuel cell assembly according to claim 1,
wherein the solid rubber is ethylene-propylene-diene rubber (EPDM) or fluorine rubber.

8. The fuel cell assembly according to claim 1,
wherein the thermoplastic polymer has an olefin-based thermoplastic resin denatured by acid.

9. A method for manufacturing the fuel cell assembly according to claim 1 comprising:
shaping a gasket from solid rubber;
disposing an electrode member that has a membrane electrode assembly having an electrolyte membrane and an electrode catalyst layer and a gas diffusion layer disposed on at least one surface of both surfaces of the membrane electrode assembly in a thickness direction, the molded gasket, and a bonding member that has a thermoplastic polymer; and
integrating the electrode member and the gasket using the bonding member by melting and then hardening the bonding member.

10. A method for manufacturing the fuel cell assembly according to claim 1 comprising:
shaping a gasket from solid rubber;
disposing an electrode member that has a membrane electrode assembly having an electrolyte membrane and an electrode catalyst layer and a gas diffusion layer disposed on at least one surface of both surfaces of the membrane electrode assembly in a thickness direction, and the molded gasket inside a shaping mold; and
integrating the electrode member and the gasket using a bonding member that is a hardened product of a liquid composition having a thermoplastic polymer by injecting the liquid composition into the shaping mold and hardening the liquid composition therein.

11. A method for manufacturing the fuel cell assembly according to claim 6 comprising:
shaping a gasket from solid rubber;
disposing, on a surface of a separator, an electrode member that has a membrane electrode assembly having an electrolyte membrane and an electrode catalyst layer and a gas diffusion layer disposed on at least one surface of both surfaces of the membrane electrode assembly in a thickness direction, the molded gasket, and a bonding member that has a thermoplastic polymer; and
integrating the electrode member, the gasket, and the separator using the bonding member by melting and then hardening the bonding member.

12. A method for manufacturing the fuel cell assembly according to claim 6 comprising:
shaping a gasket from solid rubber;
disposing a separator inside a shaping mold and further disposing, on a surface thereof, an electrode member that has a membrane electrode assembly having an electrolyte membrane and an electrode catalyst layer and a gas diffusion layer disposed on at least one surface of both surfaces of the membrane electrode assembly in a thickness direction, and the molded gasket; and
integrating the electrode member, the gasket, and the separator using a bonding member that is a hardened product of a liquid composition having a thermoplastic polymer by injecting the liquid composition into the shaping mold and hardening the liquid composition therein.

* * * * *